United States Patent [19]
Akinpelu et al.

[11] Patent Number: 5,550,912
[45] Date of Patent: Aug. 27, 1996

[54] CONNECTIONS BETWEEN A TOLL NETWORK AND MULTIPLE LOCAL NETWORKS

[75] Inventors: Akinwale A. Akinpelu, Leonardo; Promod K. Bhagat, Howell, both of N.J.; Dana L. Garoutte, Wheaton, Ill.

[73] Assignee: AT&T Corp., Murray Hill, N.J.

[21] Appl. No.: 503,254

[22] Filed: Jul. 17, 1995

Related U.S. Application Data

[63] Continuation of Ser. No. 203,102, Feb. 28, 1994, abandoned.

[51] Int. Cl.⁶ .................................................. H04M 3/00
[52] U.S. Cl. ........................ 379/221; 379/201; 379/207
[58] Field of Search .................................. 379/201, 221, 379/216, 202, 207, 112, 114, 127, 97, 100, 92, 115, 220, 230, 156, 265, 219, 229

[56] References Cited

U.S. PATENT DOCUMENTS

| | | | |
|---|---|---|---|
| 4,565,903 | 1/1986 | Riley ........................................ | 379/201 |
| 4,577,066 | 3/1986 | Bimonte et al. ......................... | 379/221 |
| 4,757,267 | 7/1988 | Riskin ..................................... | 379/201 |
| 4,866,763 | 9/1989 | Cooper et al. .......................... | 379/201 |
| 4,924,495 | 5/1990 | Richards et al. ........................ | 379/127 |
| 5,003,584 | 3/1991 | Benyacar et al. ....................... | 379/201 |
| 5,018,191 | 5/1991 | Catron et al. ........................... | 379/207 |
| 5,136,636 | 8/1992 | Wegrzynowicz ........................ | 379/207 |
| 5,237,604 | 8/1993 | Ryan ....................................... | 379/220 |
| 5,253,288 | 10/1993 | Frey et al. ............................... | 379/221 |
| 5,255,315 | 10/1993 | Bushnell .................................. | 379/221 |
| 5,311,572 | 5/1994 | Friedes et al. .......................... | 379/230 |
| 5,311,585 | 5/1994 | Armstrong et al. ..................... | 379/220 |
| 5,329,581 | 7/1994 | Friedes et al. .......................... | 379/207 |
| 5,333,184 | 7/1994 | Doherty et al. ......................... | 379/115 |
| 5,333,185 | 7/1994 | Burke et al. ............................ | 379/207 |
| 5,333,186 | 7/1994 | Gupta ...................................... | 379/114 |
| 5,335,269 | 8/1994 | Steinlicht ................................ | 379/265 |
| 5,341,415 | 8/1994 | Baran ...................................... | 379/156 |
| 5,406,620 | 4/1995 | Pei .......................................... | 379/221 |
| 5,452,350 | 9/1995 | Reynolds et al. ....................... | 379/265 |

OTHER PUBLICATIONS

J. L Averweg, et al., "The Impact of Divestiture on 5ESS®Switch Software", IEEE International Conference On Communications 1985, Chicago, IL, Jun. 23–26, 1985, *IEEE Communications Society Conference Record vol. 2.*

Primary Examiner—Jeffery Hofsass
Assistant Examiner—Scott Wolinsky
Attorney, Agent, or Firm—Werner Ulrich; Mony R. Ghose

[57] ABSTRACT

An arrangement for routing toll calls to a predominant local exchange carrier (LEC) or to a competitive access provider (CAP). An egress switch of an interexchange (toll) carrier translates the called directory number office code to determine whether that code serves a CAP. If so, an exception table is searched to identify the CAP. If the called number is not in the exception table, the call is routed to the predominant LEC. Calls may also be routed to a customer who is served by a CAP and the predominant LEC via either of these local carriers. The billing record identifies an originating and/or a terminating CAP for the call. Optionally or alternatively, an ingress IXC switch may access a data base to determine the CAP or predominant LEC serving a called customer. The ingress IXC switch then routes the call to an IXC egress switch serving the carrier that serves the called customer. Advantageously, this arrangement efficiently serves calls using a CAP to provide part of the connection.

5 Claims, 7 Drawing Sheets

5,550,912

CONNECTIONS BETWEEN A TOLL NETWORK AND MULTIPLE LOCAL NETWORKS

This application is a continuation of application Ser. No. 08/203102, filed on Feb. 28, 1994, now abandoned.

CROSS REFERENCE TO RELATED APPLICATION

This application is related to the application of:

Akinwale A. Akinpelu, Promod K. Bhagat, and Dana L. Garoutte, Ser. No. 08/203,110, which issued on Dec. 12, 1995 as U.S. Pat. No. 5,475,749 entitled "Connections Between A Toll Network And Multiple Local Networks", which application is assigned to the assignee of the present application, and which was filed concurrently therewith on Feb. 28, 1994.

TECHNICAL FIELD

This invention relates to methods and apparatus for serving competitive access providers from a toll network.

PROBLEM

The U.S. telecommunications network is in a state of transition. During the next several years it is expected that the monopoly held by local exchange carriers will be substantially altered and that competitive access providers (CAPs) will begin to offer customer access to the interexchange carriers, local exchange service, or both. In order to accomplish this goal without creating an excessive burden on customers who wish to receive service from a CAP, it is expected that there will be a requirement that the switch to a CAP need not be accompanied by a change of telephone number. Accordingly, a problem is likely to arise because customers sharing the same numbering plan area (NPA) and office code are likely to be served from different local switching systems belonging to one or more CAPs and belonging to a predominant local exchange carrier. The change to such an arrangement will require interexchange carriers (IXCs), also called toll carriers, to route traffic for telephone numbers having a common NPA and office code, at least initially, to one predominant local exchange carrier (LEC) and for a relatively small fraction of the numbers to one or more different CAPs. In order to provide proper billing of access charges to the CAPs, it is necessary to identify calls from and/or to a CAP in the call record of a toll call. In some cases, the customers on a CAP switch may not be connected to the same toll egress switch as the customers of another CAP or the predominant LEC (hereinafter referred to simply as the LEC) and such calls must also be properly routed. Some customers may choose to be served both from a CAP and an LEC with calls overflowing from the CAP to an LEC if all connections between the CAP and the customer are busy, or if connections between the IXC and CAP are busy. Finally, the present method for stopping all traffic to a hard to reach office code fails to protect CAP users against a LEC switch failure and LEC users against a CAP switch failure. Overall, therefore, a problem exists in the telecommunications network in that the basic assumptions of the public switched network routing plan are no longer valid and that equipment designed to route according to such a plan must be modified at minimum expense in order to be able to serve CAPs.

SOLUTION

The above problems are solved and an advance is made over the prior art in accordance with our invention wherein the stored program controlled switches of an IXC network are adapted to meet the new requirements in a cost effective manner. In accordance with this invention, an ingress switch queries a data base in order to determine the identity of the preferred, and, optionally, alternate terminating carriers serving the called customer. The call can then be routed directly to an IXC egress switch serving the preferred or alternate terminating local exchange carrier. A message, including the identity of the local exchange carrier and the switches for serving the called customer is sent to that IXC egress switch to route the call to the called customer.

In accordance with another aspect of the invention, the incoming trunk translations to an ingress toll IXC switch are enhanced to provide a translation to identify the CAP to which the incoming trunk of a call is connected. This data is then recorded by the ingress toll switch in the record of the toll call. The toll switch makes a billing/Automatic Message Accounting (AMA) record for the call. If the egress toll switch successfully routes a call via an outgoing trunk to a CAP switch, the egress toll switch sends a message over common channel signaling system of the toll network to the ingress toll switch which then records the identity of the terminating CAP.

DETAILED DESCRIPTION

Figure 1:
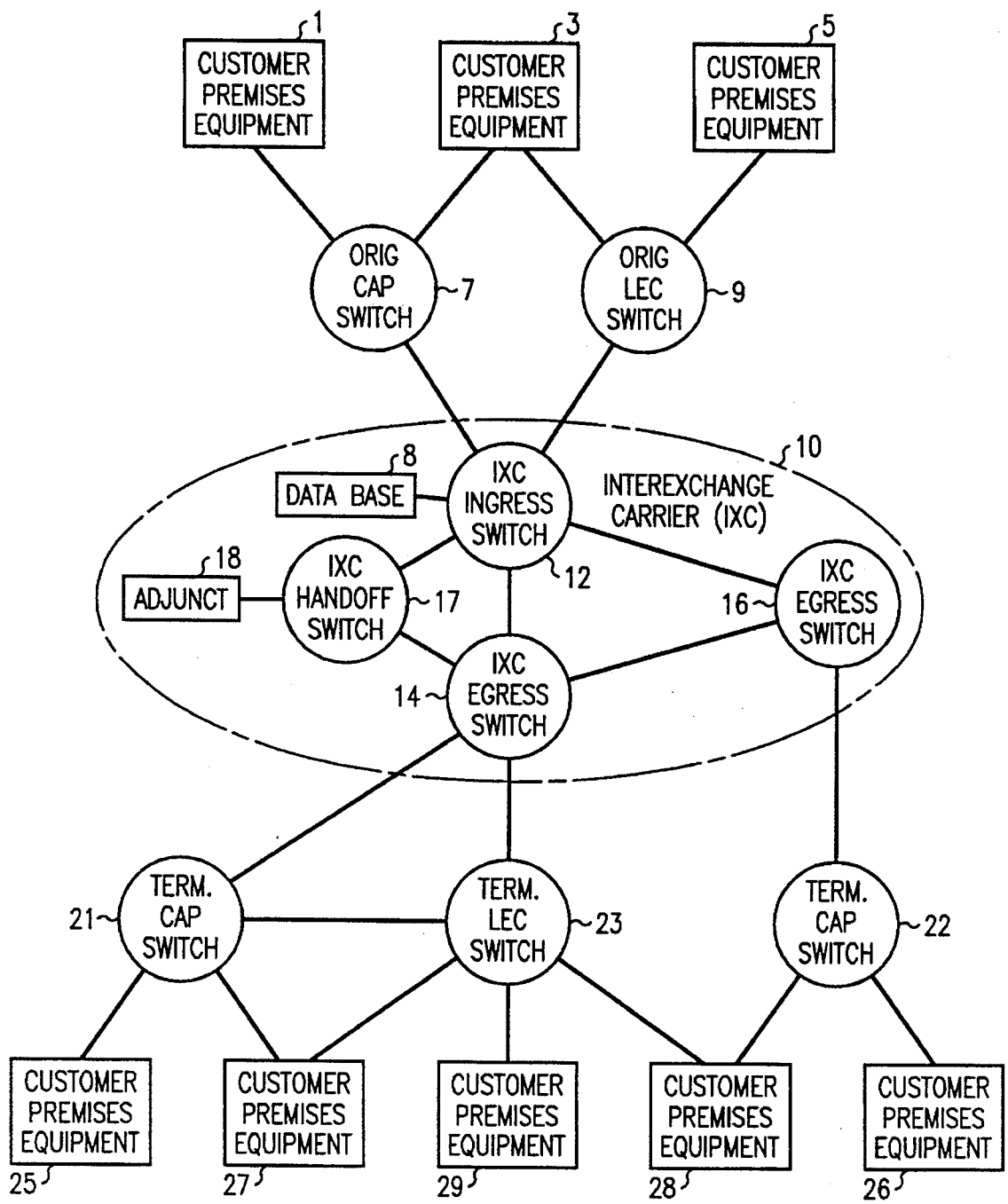
FIG. 1 is a block diagram illustrating the operation of applicants' invention.

FIG. 1 is an overall block diagram of the networks and switches used for interconnecting customer premises equipment connected to CAP switches and connected to LEC switches. For convenience, the calls of this description are calls which are originated by one of the Customer Premises Equipments (CPEs) 1, 3, or 5 and are terminated on one of the CPEs 25–29. The originating CPE is connected to an originating CAP switch 7 or an originating LEC switch 9 and the terminating CPEs are connected to a terminating LEC switch 23 or one of the terminating CAP switches 21, 22. In general, those CPEs which are connected to two switches are private branch exchanges (PBXs) with a plurality of facilities interconnecting the private branch exchange with one or more switches. The CPE shown connected to a single switch may be either a private customer telephone station or PBX or key telephone system. In rare instances it may be desirable to connect an emergency type single station or key telephone set or multiple telephone stations to two switches through appropriate equipment (not shown) for automatically selecting one of the switches so that, for example, the station may be connected to an LEC switch normally and, in case the LEC switch fails, be connected to a CAP switch.

The originating and terminating local switches shown in FIG. 1 are interconnected by an interexchange carrier (IXC) network which includes an ingress switch 12 connected to the originating switches, and a pair of egress switches 14 and 16 connected to the terminating switches. Again, as in the case of the local switches 7, 9, 21, 22, and 23, switches 12, 14, and 16 are each both ingress and egress switches and have been labeled ingress and egress switches on FIG. 1 to illustrate the calls described herein. In accordance with applicants' invention, when a caller at CPE 1, 3, or 5 originates a call, the call is routed via one of the local switches 7 and 9 to IXC ingress switch 12 which routes the call to IXC egress switch 14 based on the routing translation of the numbering plan area (NPA) and office code (OC). In IXC egress switch 14, an exception translation is made to see if the called number is served from one of the CAP switches 21, 22. If the called customer is served from CAP switch 21, then the call is routed to that switch. If it is served from CAP switch 22, the call is routed via egress switch 16 to CAP switch 22. If the called number is not found in the exception translation, IXC egress switch 14 will route the call via LEC switch 23; in effect the default translation, in case no specific translation is found for a particular called number, is that the called number is served from the LEC switch. If the destination is a customer such as that served by CPE 27, which is connected to both terminating CAP switch 21 and terminating LEC switch 23, if all trunks between IXC egress switch 14 and terminating CAP switch 21 are busy, the call will automatically be routed via terminating LEC switch 23. If one or more trunks between egress switch 14 and CAP switch 21 are available, but no PBX trunks to CPE 27 are available from CAP switch 21 then CAP switch 21 will send a release message to IXC egress switch 14 indicating as the cause of the release the unavailability of terminating PBX trunks. In response to this release message, IXC egress switch 14 will route the call via LEC switch 23, whose identity is found in the translations of IXC egress switch 14, to the customer served by CPE 27.

The IXC network is ganged to have the ingress IXC switch query a data base 8, shared by a plurality of the switches of the IXC carrier, in order to identify the preferred terminating carrier and terminating switch, and optionally, alternate terminating carriers and switches for serving the called customer. Advantageously, the call can then be routed directly to an IXC egress switch, such as IXC egress switch 16 which serves the preferred terminating carrier (or, if all trunks to that IXC egress switch are busy, to an IXC egress switch serving an alternate terminating carrier).

The IXC switches are stored program controlled switches, such as AT&T's 4ESS™ switch well known in the prior art. These switches includes one or more control processors for controlling operations of the switch under the control of a program of the processor, and include memory for storing translations including those described above.

Figure 2:
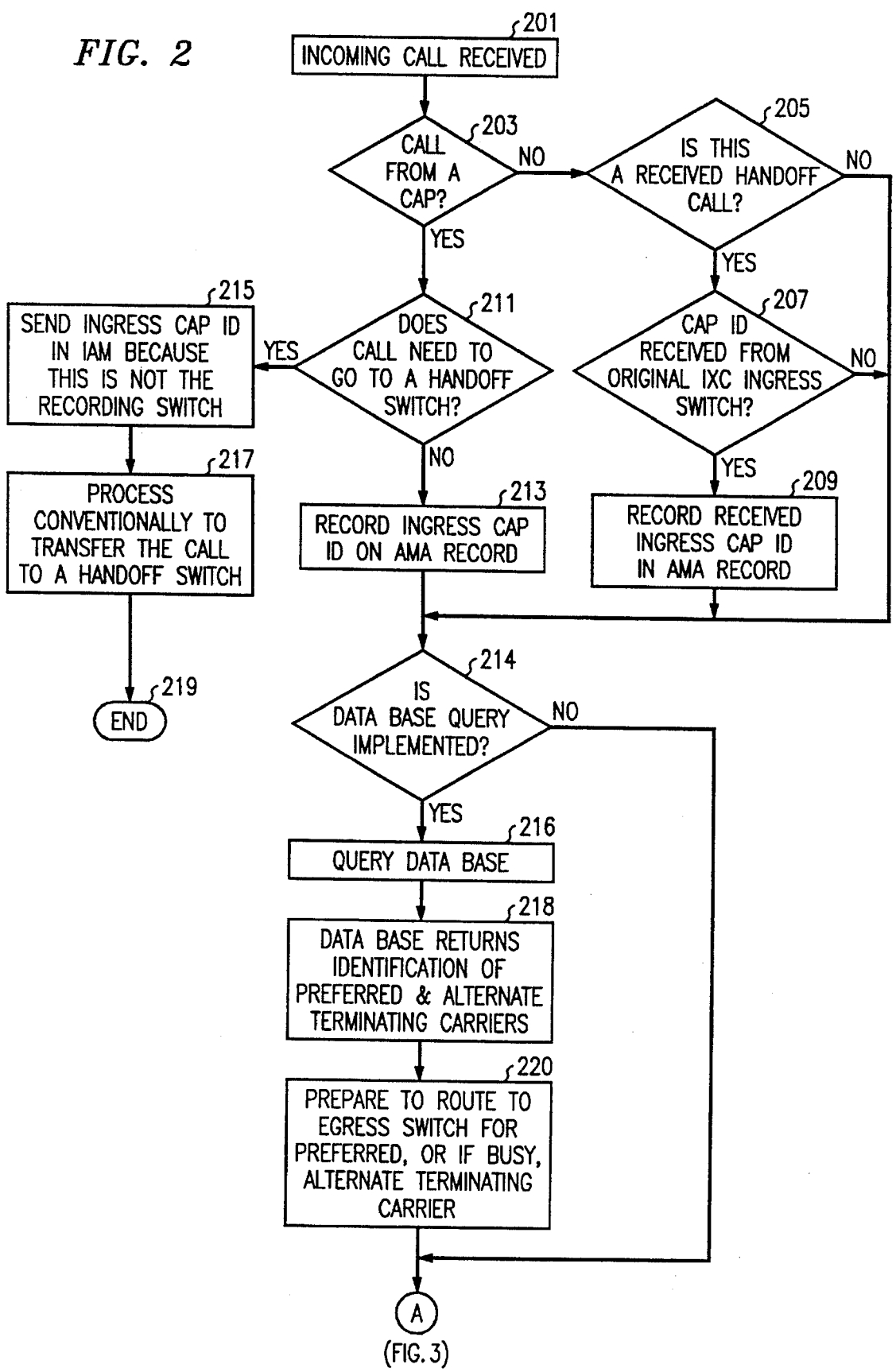
FIGS. 2–7 are flow diagrams of programs used by switches in an interexchange carrier network for controlling the method of applicants' invention.

FIG. 2 is a flow diagram of actions performed in the ingress IXC switch, a switch which also creates a billing (AMA) record for subsequently charging the customer. The incoming call is received from a CAP switch or an LEC switch (action block 201). Test 203 is used to determine whether the call was from a CAP switch. If not, test 205 is used to determine whether this is a received handoff call, i.e., a call handed off from the ingress IXC switch to handoff switch connected to an adjunct for access to the adjunct, and thereafter, for further access to the IXC network. The adjunct is used for prompting a caller, collecting DTMF digits from a caller and for deriving information for the AMA record for a call, and is used when the caller has features such as subaccount billing which require special service processing. If this is a handoff call, test 207 determines whether the call originated from a CAP, indicated by the receipt of a CAP identity from the previous IXC switch, and if so the received CAP ID is recorded in the AMA record for the call (action block 209). If the result of test 205 or 207 was negative, then no CAP ID is entered in the AMA record.

If the result of test 203 is positive, i.e., that the call is from a CAP, then test 211 is used to determine whether the call needs to go to a handoff switch, in this case a handoff switch 17, connected to an adjunct 18, in the IXC network, for handling calls that need special service processing not available at the ingress IXC switch. The CAP identification is sent in the initial address message (IAM) (action block 215) because this is not the recording switch. The call is then processed conventionally (action block 217) and routed to the handoff switch for special service processing and for further routing to the destination. This is the end of actions on this call by the ingress IXC switch (end block 219). If the call does not need to go to a handoff switch, then the ingress CAP identity is recorded in the AMA record for this call (action block 213).

Following execution of action block 213, or action block 209, or a negative result of test 205, test 214 is used to determine if a data base query has been implemented in the ingress switch for this type of call. It is necessary for this query to be implemented in order to carry out applicants' invention. If a data base query has been implemented, then the data base (date base 8, in this case) is queried (action block 216). Data base 8 returns an answer identifying the preferred, and, optionally, alternate carriers for serving the called customer (action block 218). The purpose of the data base query is to route the call to an IXC egress switch for serving the called customer (for example, IXC egress switch 14) instead of automatically routing the call to the IXC egress switch 16 which serves the predominant LEC carrier. Additionally, data identifying the IXC egress switch, the preferred and alternate carriers, and the identity of the terminating switch(es) of these carriers for serving the call are transmitted in common channel signaling messages to the egress switch, which then does not need to perform translations to identify these carriers and switches. After action block 218 has been executed, the ingress switch prepares to route the call to an egress switch for the preferred terminating carrier, or if that carrier is busy, an alternate terminating carrier (action block 220). Thereafter, the actions illustrated in FIG. 3 are performed.

Figure 3:
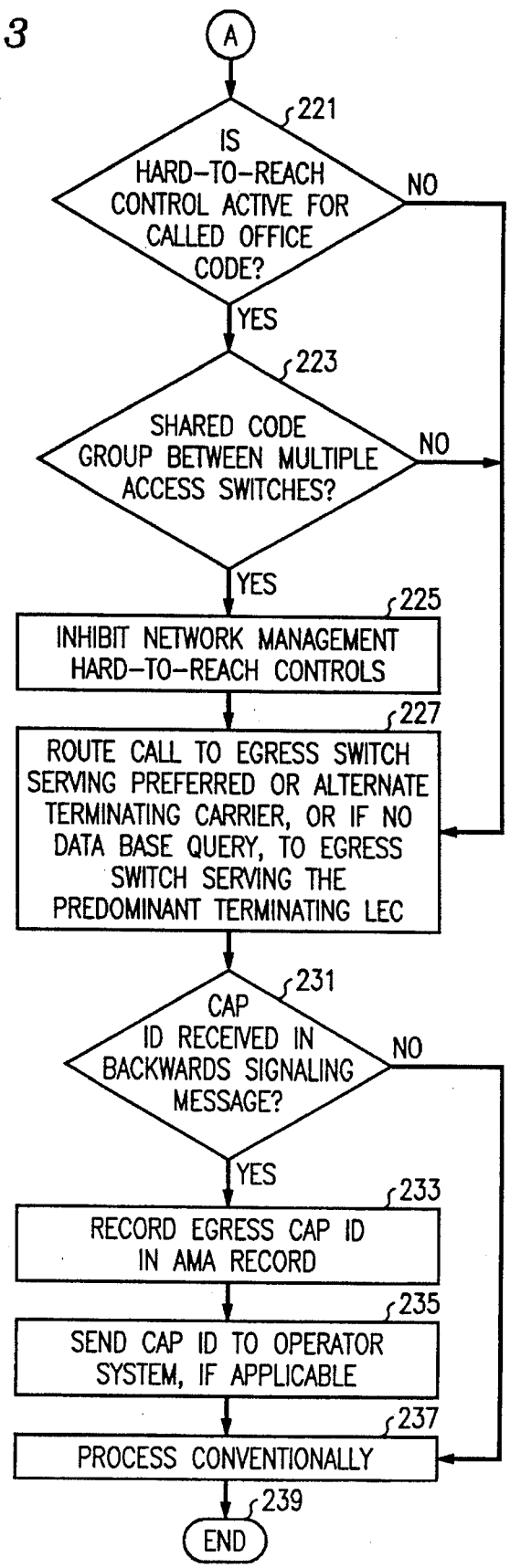
Figure 4:
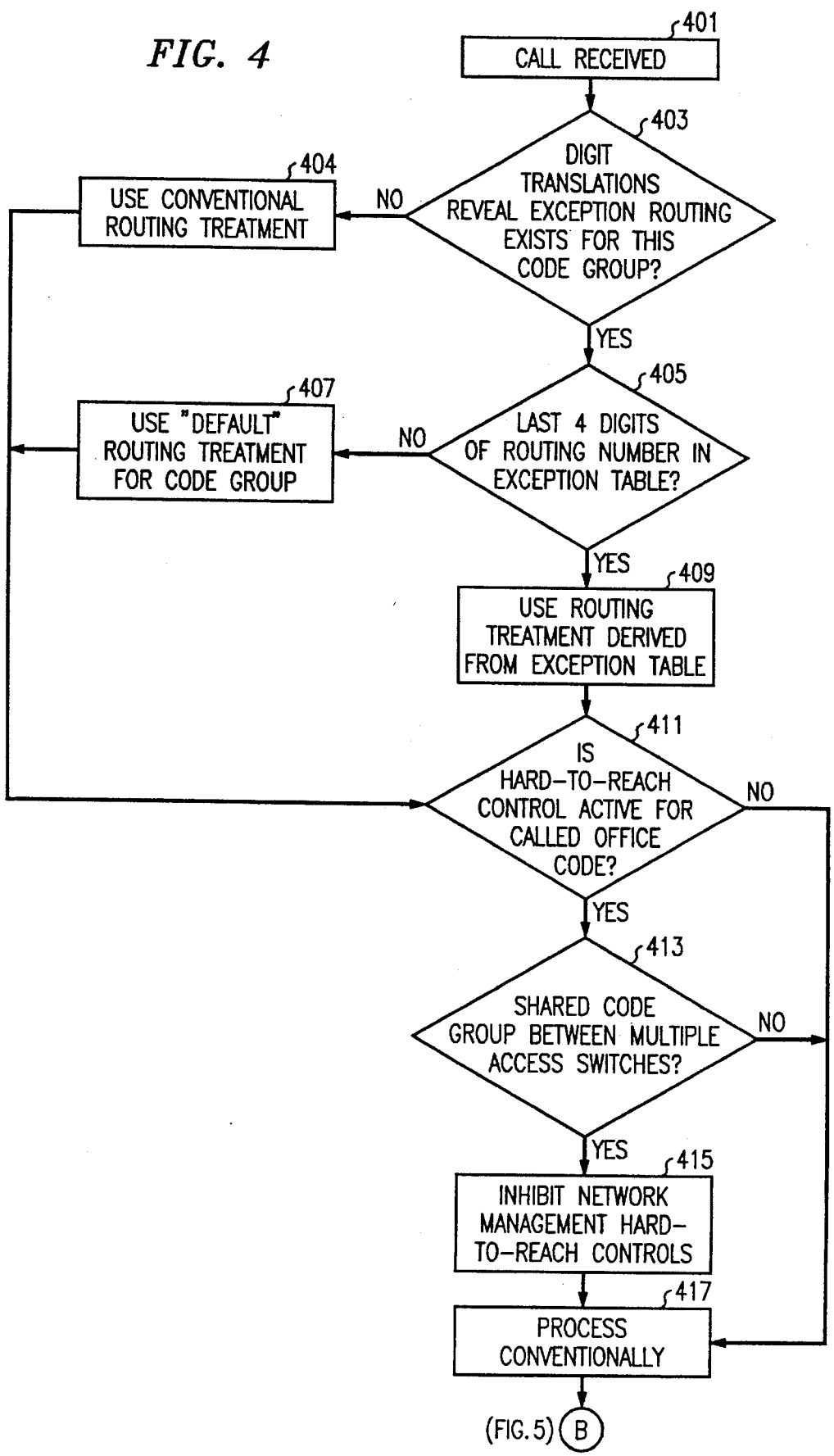

FIG. 3 illustrates further actions performed by the ingress IXC switch for routing the call toward the egress IXC switch. Test 221 is used to determine whether the hard to reach control indicator is active for the called office code. If so, test 223 is used to determine whether the called office code is a shared group between multiple access switches. If so, then the network management hard to reach controls are inhibited in the ingress switch for this call (action block 225). Following action block 225 or a negative result of tests 221 or 223, the call is routed to the egress IXC switch serving the predominant terminating LEC carrier, or, if the data base query has been implemented and performed, to the IXC switch serving the preferred or alternate terminating carriers serving the called customer (action block 227). The call is then further processed conventionally up to address complete (action block 227). Address complete signifies that the call has been received and processed by the destination switch, that the customer line is available, but that the customer has not yet answered the call. Test 231 is then used to determine whether a CAP identification was received in the backwards signaling message from the egress IXC switch. If so, the egress CAP identification is entered in the AMA record for the call (action block 233) and if the call has been served by an operator system such as the OSPS feature described, for example, in Paper 3, Session 22C, International Switching Symposium, May, 1984, of the No. 5ESS® described, for example, in *AT&T Technical Journal*, Vol. 64, no. 6, part 2, pp. 1305–1564. The operator system will be sent the CAP identification (action block 235). Following action block 235 or a negative result of test 231, the call will continue to be processed conventionally (action block 237) until the call is completed (end block 239).

FIGS. 4–7 illustrate the actions performed in the egress switch of the IXC network. Blocks 403–409 illustrate the case wherein the ingress IXC switch did not perform the data base query described in blocks 216 and 218 of FIG. 2. If such a query has been made, the preferred and alternate terminating local carriers for the call have already been selected and the initial address or other message would carry this data to the egress IXC switch, and blocks 403–409 are skipped. Alternatively, even in that case, a translation may be made to select the proper switch of the selected carrier for serving the called customer if the identity of that switch has not been provided in the common channel signaling messages received by the egress IXC switch. The call is received (action block 401), digit translations are made and tested to see whether the office code includes exception routing (test 403). If not, then conventional routing treatment is used (action block 404) and test 413 (described hereinafter) is entered. If so, test 405 is used to determine whether the last four digits of the number are in the exception table. If so, the routing treatment is derived from the exception table (action block 409). Otherwise, default routing treatment is used (action block 407). In general, action block 407 is likely to represent the situation wherein an LEC serves the terminating customer. Although it is possible in the future that some CAP may handle the bulk of traffic and only a few exceptional customers are served by the LEC, in which case the default routing would be to the CAP that is handling the bulk of the traffic.

Next, test 411 is used to determine whether the hard to reach control is active for the called office code. If so, test 413 is used to determine whether the office code is shared between multiple access switches and if so the network management hard to reach control is inhibited (action block 415). If either test 411 or 413 is negative, then the action of block 415 is not performed. Thereafter, the call is processed conventionally (action block 417) until the process of selecting an outgoing trunk (starting with test 501) is entered.

Figure 5:
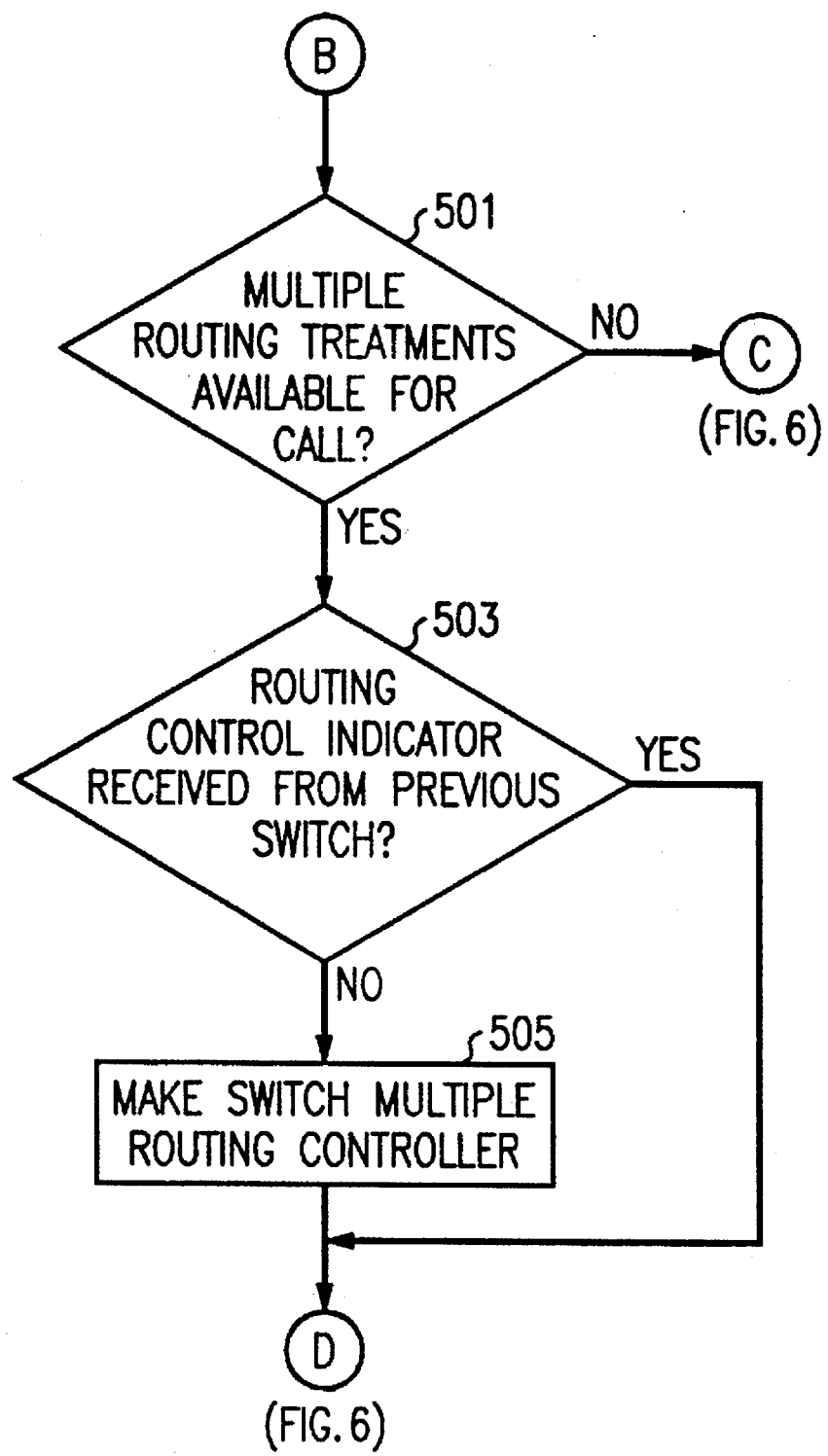

Test 501 of FIG. 5 determines whether multiple routing treatments are available for the call. Multiple routing treatments are clearly available if the LEC and CAP home on different IXC switches, and are also available even when the LEC and CAP home on the same switch. If not, action block 611 of FIG. 6, to be described hereinafter, is entered because the routing to the destination switch is straightforward. If multiple routing treatments are available for the call, then test 503 determines whether a routing control indicator has been received from a previous switch. If not, this egress switch becomes the multiple routing controller because it is the first of the multiple egress switches (action block 505) and in either case test 603 of FIG. 6 is entered.

Figure 6:
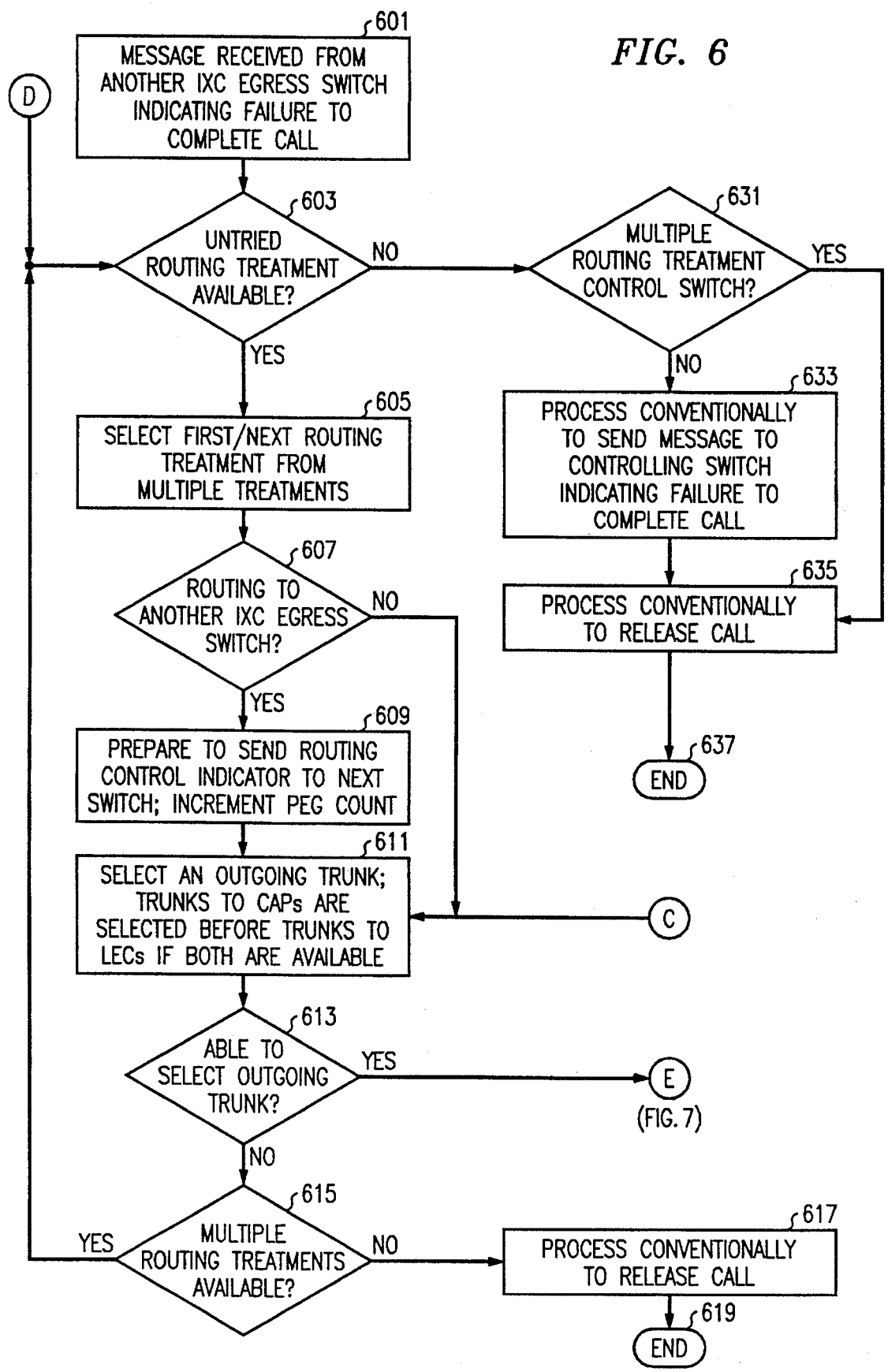

FIG. 6 relates to multiple routing treatments and is entered from FIG. 5 or from the loop resulting from the positive output of test 615 of FIG. 6. Action block 60 1 indicates that a message has been received from another egress IXC switch, indicating failure to complete the call. Test 603 determines whether the alternate routing treatments have been exhausted with a positive outcome indicating that untried routing treatments are still available. If that is the case, action block 605 is used to select the first or next routing treatment from the possible multiple treatments for a call to the selected destination. Test 607 is used to determine whether the routing for this particular treatment is via another IXC egress switch. If so, a routing control indicator is sent to the next switch and the peg count of such alternate routing is incremented (action block 609). Thereafter, or following a negative result of test 607, action block 611 which is the beginning of the actions associated with the process routing treatment is entered. An outgoing trunk is selected. The trunks to CAPs are selected before trunks to LECs if both are available because the trunks to the CAPs are direct. Test 613 is used to determine whether an outgoing trunk is available and can be selected. If so, indicator 701 (FIG. 7) which indicates that routing is now complete, is entered. If no outgoing trunk is available in test 613 then test 615 is used to determine whether multiple routing treatments are available for this call and, if so, test 603 is reentered. If multiple routing treatments are not available for this call, the call is processed conventionally to release the call (action block 617) because the call is blocked. This is the end of the process for that call (end symbol 619).

If no more untried routing treatments are available, then test 63 1 is used to determine whether this is the multiple treatment control switch. If not, action block 633 is used to send an unable to complete message to the controlling switch and, in either case action block 635 is entered to release the call conventionally. Action block 635 is followed by the end symbol 637.

Figure 7:
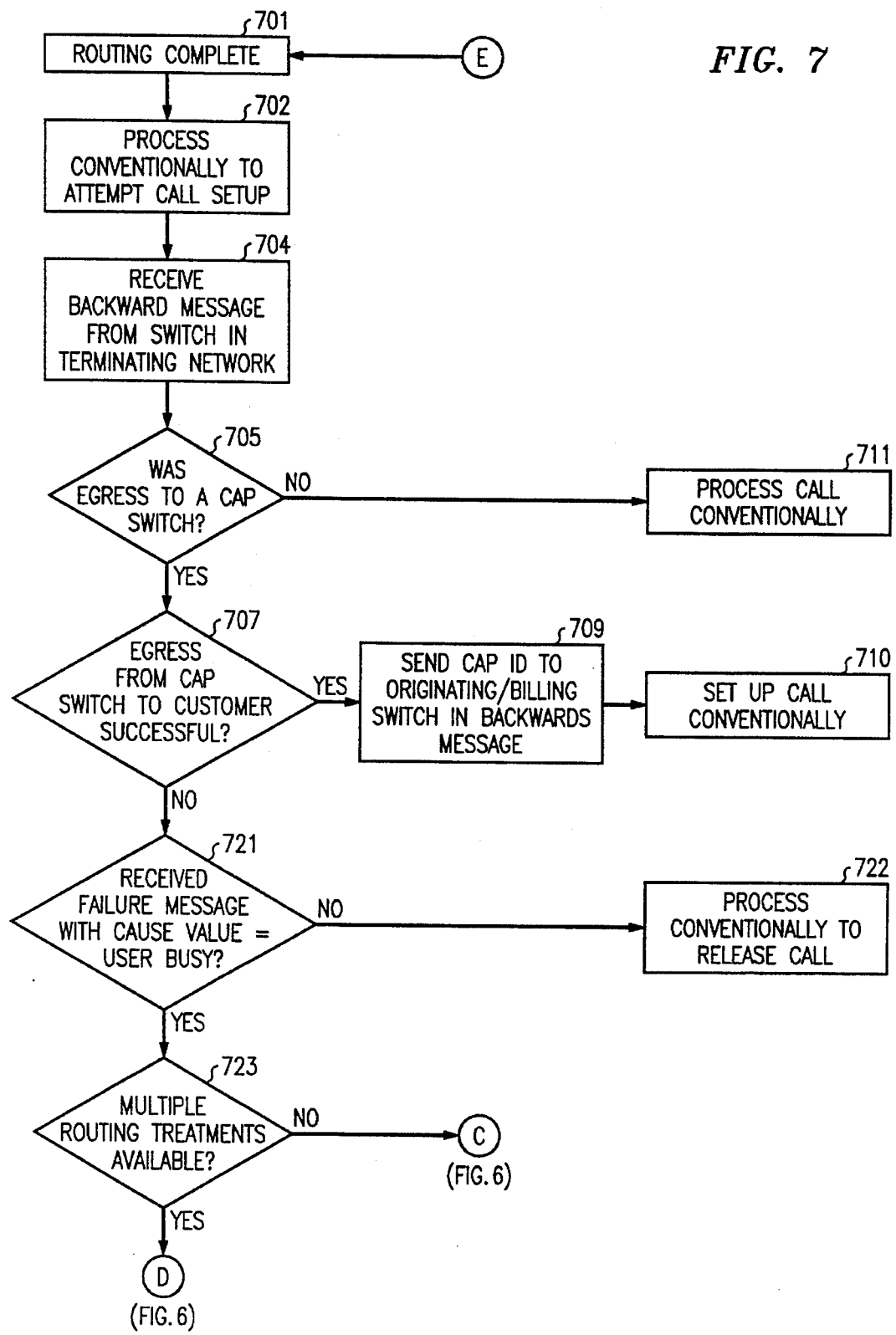

FIG. 7 illustrates the actions following the recognition that routing is now complete (action block 701). This is entered following the positive result of test 613, namely, the ability to select an outgoing trunk from the egress switch. The call is then processed conventionally to attempt call setup (action block 702). A backward message is received from the switch in the terminating network (action block 704). Test 705 is used to determine whether the egress was to a CAP switch. If not, the call is processed conventionally (action block 711 ) because this is a call to an LEC switch. If the egress was to a CAP switch (positive result of test 705) test 707 is used to determine whether the egress from the CAP switch to the customer was successful. If so, then the CAP identification is sent back to the originating/billing switch in a backward message (action block 709) and the call is setup conventionally using the CAP switch (action block 710). If the egress from the CAP switch to the customer was not successful (negative result of test 707) then the call is released (action block 722). If the received failure message had the cause value user busy (positive result of test 721) it is an indication that the final customer was not reachable using the primary route. Test 723 is then used to determine if multiple routing treatments are available. If not, then action block 611 used to select an outgoing trunk is directly entered. If the result of test 723 is positive, then test 603 used in the loop for multiple routing treatments is entered in order to try multiple routing treatments.

The actions performed in the CAP switches are conventional actions and are controlled, for example, by the software of the current generic program of a 5ESS switch. CAP switches are required to have the ability to home on a plurality of IXC switches, for service by a plurality of IXCs. Translations in the CAP switch determine which IXC switch a particular customer may access for routing outgoing calls. In addition, the treatment in CAP switches of AMA records is sometimes different. For example, rated records, i.e., records for which the charge rates have been determined, generated within a CAP switch are sent directly to the IXC billing systems for intra-LATA toll calls.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of routing a call from an interexchange carrier (IXC) to one of a plurality of terminating local exchange carriers, wherein a called party of said call is identified by a called number comprising an office code, individual telephone numbers within said office code being assigned to subscribers of different ones of said plurality of local exchange carriers, and wherein different ones of said plurality of local exchange carriers are served from different egress switches of said IXC, the method comprising the steps of:

accessing a data base by an IXC ingress switch connected to said egress switches to identify a terminating local exchange carrier, based on a telephone number within said called number's office code, to which said call is to be routed; and routing said call to said identified terminating local exchange carrier via one of said egress switches.

2. The method of claim 1, further comprising the step of:

accessing said data base to identify an alternate terminating local exchange carrier for said call.

3. The method of claim 1, further comprising the step of:

if all trunks from said one IXC egress switch to said identified terminating carrier are busy, routing said call via an identified alternate terminating local exchange carrier for said office code.

4. The method of claim 1, further comprising the step of:

if all lines or PBX trunks from said terminating carrier to said called party are busy, returning a release message to said one IXC egress switch and attempting to route said call via an identified alternate terminating local exchange carrier.

5. The method of claim 1, further comprising the steps of:

translating an identity of an incoming trunk serving said call in said ingress IXC switch to identify a terminating local exchange carrier serving said call; and recording the identity of said terminating local exchange carrier in a billing record for said call.

* * * * *